United States Patent
Barjhoux et al.

(10) Patent No.: US 10,767,923 B2
(45) Date of Patent: Sep. 8, 2020

(54) DEVICE AND METHOD FOR PURIFYING A GAS MIXTURE

(71) Applicant: L'Air Liquide, Societe Anonyme pour l'Etude et l'Exploitation des Procedes Georges Claude, Paris (FR)

(72) Inventors: Pierre Barjhoux, La Tronche (FR); Camille Bouvier, Grenoble (FR); Fabien Durand, Voreppe (FR); Martin Staempflin, Quaix en Chartreuse (FR); Golo Zick, Fountaine (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 122 days.

(21) Appl. No.: 15/981,378

(22) Filed: May 16, 2018

(65) Prior Publication Data
US 2018/0335255 A1    Nov. 22, 2018

(30) Foreign Application Priority Data
May 22, 2017    (FR) ...................................... 17 54497

(51) Int. Cl.
*F25J 3/04*    (2006.01)
*F25B 9/14*    (2006.01)
(Continued)

(52) U.S. Cl.
CPC .............. *F25J 3/044* (2013.01); *B01D 53/04* (2013.01); *B01D 53/261* (2013.01);
(Continued)

(58) Field of Classification Search
CPC ........ F25J 3/04; F25J 3/04806; F25J 3/04169; F25J 3/04733; F25J 3/04757;
(Continued)

(56) References Cited

U.S. PATENT DOCUMENTS 3,377,812 A * 4/1968 Garrett ................... B01D 53/04
62/638
3,517,521 A * 6/1970 Emerson .................. F25J 3/028
62/637
(Continued)

FOREIGN PATENT DOCUMENTS

DE        2 207 509         9/1972
DE    10 2010 042247         1/2012
(Continued)

OTHER PUBLICATIONS

French Search Report and Written Opinion for FR 1754497, dated Jan. 11, 2018.
(Continued)

*Primary Examiner* — Frantz F Jules
*Assistant Examiner* — Erik Mendoza-Wilkenfel
(74) *Attorney, Agent, or Firm* — Christopher J. Cronin

(57) ABSTRACT

Device and method for purifying a gas mixture to produce a concentrated gas, notably neon, starting from a mixture comprising neon, said device including, in a cold box housing a cryogenic purification circuit comprising, in series, at least one unit for purifying the mixture by cryogenic adsorption at a temperature between 65K and 100K and notably 65K, then a unit for cooling the mixture to a temperature between 25 and 65 K and then a unit for cryogenic distillation of the mixture to produce the concentrated liquid at the outlet of the cryogenic distillation unit, characterized in that the unit for cooling the mixture to a temperature between 25 and 65 K comprises at least one cryocooler that extracts thermal power from the mixture via a heat exchanger.

14 Claims, 1 Drawing Sheet

(51) Int. Cl.
*B01D 53/04* (2006.01)
*C01B 23/00* (2006.01)
*F25J 3/08* (2006.01)
*B01D 53/26* (2006.01)
*F25J 3/02* (2006.01)

(52) U.S. Cl.
CPC .......... *C01B 23/0036* (2013.01); *F25J 3/028* (2013.01); *F25J 3/029* (2013.01); *F25J 3/0257* (2013.01); *F25J 3/04157* (2013.01); *F25J 3/04636* (2013.01); *F25J 3/08* (2013.01); *B01D 2256/18* (2013.01); *B01D 2257/504* (2013.01); *B01D 2257/80* (2013.01); *C01B 2210/005* (2013.01); *C01B 2210/0009* (2013.01); *C01B 2210/0032* (2013.01); *C01B 2210/0045* (2013.01); *C01B 2210/0046* (2013.01); *C01B 2210/0082* (2013.01); *F25J 2200/02* (2013.01); *F25J 2200/70* (2013.01); *F25J 2205/04* (2013.01); *F25J 2205/40* (2013.01); *F25J 2205/60* (2013.01); *F25J 2205/82* (2013.01); *F25J 2210/04* (2013.01); *F25J 2210/40* (2013.01); *F25J 2210/42* (2013.01); *F25J 2215/32* (2013.01); *F25J 2220/02* (2013.01); *F25J 2245/02* (2013.01); *F25J 2270/02* (2013.01); *F25J 2270/60* (2013.01); *F25J 2270/90* (2013.01); *F25J 2270/904* (2013.01); *F25J 2270/908* (2013.01); *F25J 2270/91* (2013.01); *F25J 2270/912* (2013.01)

(58) Field of Classification Search
CPC .. F25J 2215/32; F25J 2215/44; F25J 2215/52; F25J 2215/56; F25J 2220/02; F25J 2220/04; F25J 2220/40; F25J 2220/42; F25J 2220/44; F25J 2220/50; F25J 2220/52; F25J 2270/908; F25J 2270/91; F25J 2270/912; F25J 2205/24; F25J 2205/60; F25J 2205/68; B01D 53/0454; B01D 53/0462; B01D 53/047; B01D 53/0473; B01D 53/0476; B01D 53/1437; C01B 23/001; C01B 23/0052; C01B 23/0078; F25B 9/14; F25B 9/145
See application file for complete search history.

(56) References Cited

U.S. PATENT DOCUMENTS

| | | | | |
|---|---|---|---|---|
| 3,854,914 | A * | 12/1974 | Leyarovski | F25J 3/028 62/648 |
| 5,661,987 | A * | 9/1997 | Zarate | B01D 53/0473 62/641 |
| 6,269,658 | B1 * | 8/2001 | Royal | F25J 3/04278 62/6 |
| 2015/0013349 | A1 * | 1/2015 | Dong | F25J 3/0685 62/6 |
| 2015/0345834 | A1 | 12/2015 | Barjhoux et al. | |

FOREIGN PATENT DOCUMENTS

FR    1 578 463    8/1969
FR    3 000 541    7/2014

OTHER PUBLICATIONS

Bondarenko, et al., "Wave Cryogenerators Applied in Technologies of Rare Gas Separation," International Congress of Refrigeration Proceedings—Congresinternational Du Froid, Comptes Rendus, Apr. 21, 2007, pp. 1-8.

* cited by examiner

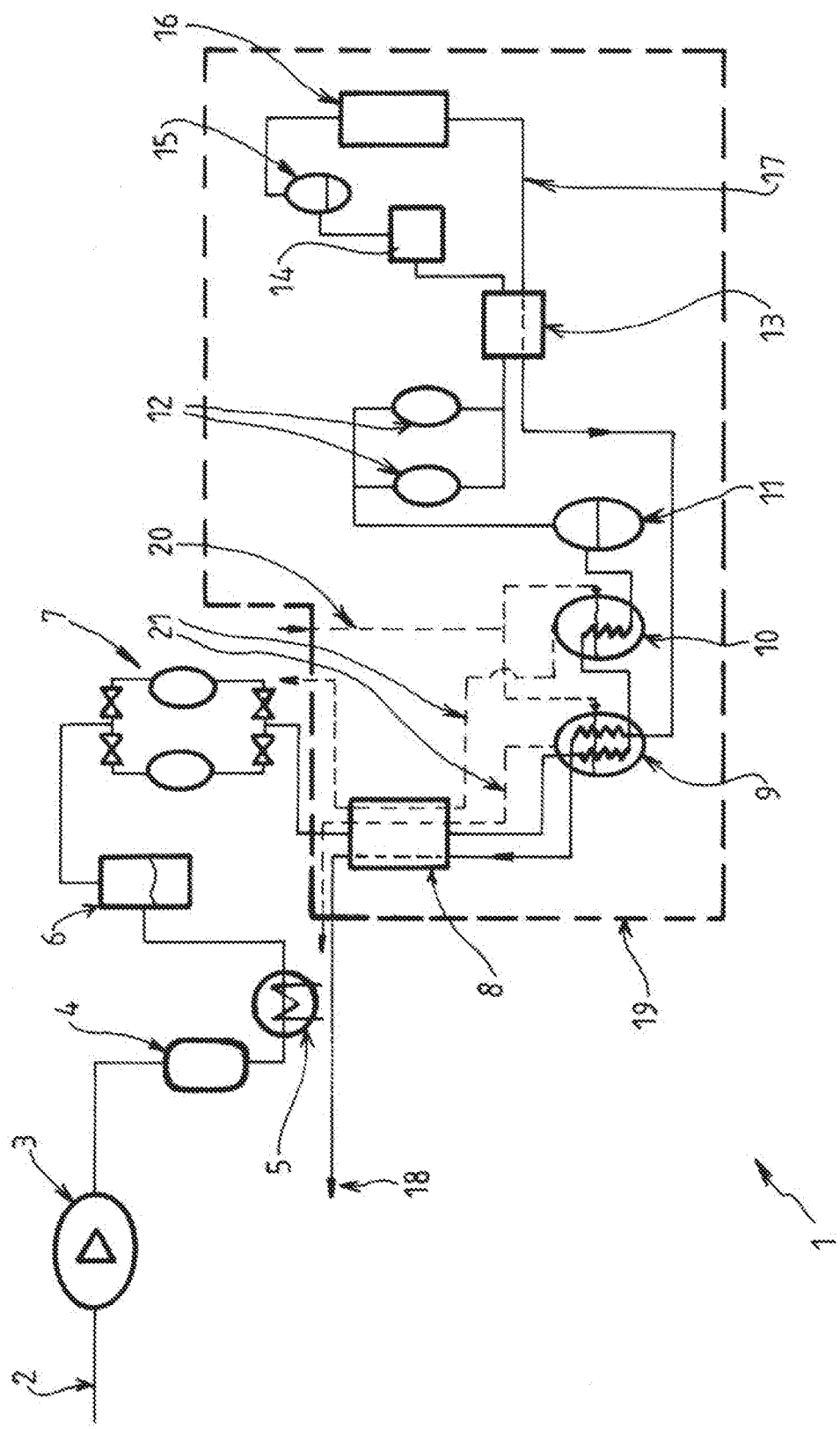

DEVICE AND METHOD FOR PURIFYING A GAS MIXTURE

CROSS-REFERENCE TO RELATED APPLICATIONS

This application claims the benefit of priority under 35 U.S.C. § 119 (a) and (b) to French patent application No. FR 1754497, filed May 22, 2017, the entire contents of which are incorporated herein by reference.

BACKGROUND

Field of the Invention

The invention relates to a method and a device for purifying a gas mixture.

The invention relates in particular to the purification of a gas mixture to obtain a pure or almost pure gas, for example neon.

The invention relates more particularly to a device for purifying a gas mixture to produce a concentrated gas, notably neon, starting from a mixture comprising neon, said device comprising, in a cold box housing a cryogenic purification circuit comprising, in series, at least one unit for purification of the mixture by cryogenic adsorption at a temperature between 65K and 100K and notably 65K, then a unit for cooling the mixture to a temperature between 25 and 65 K and then a unit for cryogenic distillation of the mixture to produce said concentrated liquid at the outlet of the cryogenic distillation unit.

Related Art

Neon is a rare gas used extensively in electronics.

For these applications in particular, this gas must be purified to quite high levels of purity (impurities present at the end of treatment of the order of a few ppm).

There are several purification concepts for obtaining the concentrated gas.

However, the known methods cannot easily reconcile the requirements of purity, the ability to purify impure gases (for a wide range of compositions at process inlet) and energy performance.

The known methods for purifying neon generally use cryogenic purification coupled to cryogenic distillation.

Document DE102010042247 describes the use of a helium closed loop (cycle of the inverted Brayton type: membrane compression and two turbines in series) for cooling the mixture to a temperature of 26K and for condensing the neon with a view to gravity separation from helium. Downstream, purification is completed with cryogenic distillation.

According to other known solutions, purification is obtained by successive operations of compression and expansion. With this type of method it is not possible to reach purities of the order of a ppm, but rather of the order of a percent. In fact, the helium impurity is still dissolved in the liquid neon unless an (efficient) final distillation column is used.

SUMMARY OF THE INVENTION

One aim of the present invention is to overcome some or all of the drawbacks of the prior art described above.

For this purpose, the method according to the invention, moreover complying with the general definition presented in the foregoing, is essentially characterized in that the unit for cooling the mixture to a temperature between 25 and 65 K comprises at least one cryogenic cooler that extracts thermal power from the mixture via a heat exchanger.

The use of a cold source of the cryogenic cooler type, called a "cryocooler", before cryogenic distillation makes it possible to perfect the purification of the gas extremely efficiently.

In fact, this cold source is local. "Local cold source" denotes a system for cold production that is not in stages. Cold power is generated at a given temperature and at one end of this system, as opposed to a cycle for production of cold that produces cold power at the level of various separate stages (different ends) at different respective temperatures.

Fine control of temperature is possible. This allows the closest approach, if necessary, to the triple point of the gas to be condensed, thus depleting the liquid phase of impurities.

Moreover, embodiments of the invention may comprise one or more of the following features:

- the at least one cryocooler comprises at least one cryocooler of the Gifford McMahon type or a pulsed gas tube or a cryocooler of the Stirling type or a cryocooler of the Joule-Thomson or reverse Brayton cycle type
- the cooling unit comprises several cryocoolers in series and at least one heat exchanger receiving the fluid mixture, in heat exchange with the cold surfaces of said cryocoolers in series,
- the device comprises, in the cold box, upstream of the unit for purification by cryogenic adsorption, at least one from: a first cryogenic exchanger for cooling the mixture configured to cool the mixture to a temperature between 65K and 110K and preferably equal to 80K, at least one bath of liquid nitrogen in heat exchange with a pipeline that conveys the mixture,
- the unit for purification by cryogenic adsorption comprises at least two adsorbers arranged in parallel immersed in baths of liquid nitrogen at 65K and operating alternately (adsorption phase/regeneration phase),
- the cryogenic distillation unit is a column for separating neon and helium,
- the device comprises a pipeline for recovery of the liquefied concentrated gas at the outlet of the cryogenic distillation unit, the recovery pipeline is put in heat exchange with at least one unit for cooling the mixture located in the cold box,
- the pipeline for recovery of the liquefied concentrated gas is in heat exchange with at least one from: a bath of liquid nitrogen in heat exchange with a pipeline that conveys the mixture upstream of the unit for purification by cryogenic adsorption, an exchanger for cooling the mixture located upstream of the cryocooler,
- the device comprises, upstream of the cold box, at least one from: a unit for withdrawing at least part of the hydrogen contained in the mixture, a desiccator for withdrawing at least part of the water and/or $CO_2$ contained in the mixture,
- the unit for withdrawing at least part of the hydrogen contained in the mixture comprises a catalytic reactor configured for converting the hydrogen in the mixture to water by reaction with oxygen,
- the desiccator comprises at least one and preferably two adsorbents for trapping water and carbon dioxide operating alternately.

The invention also relates to a method for purifying a gas mixture comprising neon with a view to producing a neon-enriched gas, said method using a purification device according to any one of the features given above or hereunder, said method comprising a step for purifying the mixture by cryogenic adsorption via the unit for purification by cryogenic adsorption at a temperature between 63.5K and 80K to remove at least part of the nitrogen, oxygen, carbon monoxide and argon from the mixture, then a step for cooling the mixture to a temperature between 25 and 65 K via the cryocooler and close to the triple point of neon in order to condense the neon, and then a step of cryogenic distillation of the mixture in the cryogenic distillation unit to produce said neon-enriched liquid at the outlet of the cryogenic distillation unit.

According to other particular features:
- the gas mixture to be purified comprises neon in a proportion by volume between 15 and 65%, helium in a proportion by volume between 3 and 20%, hydrogen in a proportion by volume between 0.2 and 4%, nitrogen in a proportion by volume between 20 and 60% and said concentrated gas produced contains neon in a proportion by volume between 85 and 100%,
- the ratio (or yield) between the volume flow rate of neon at the inlet of the device and the volume flow rate of neon at the outlet of the device is greater than 85% and preferably between 85 and 98%.

The invention may also relate to any alternative device or method comprising any combination of the features given above or hereunder.

Other particular features and advantages will become clearer on reading the following description, referring to the single FIGURE, which shows a schematic partial view illustrating an example of the structure and operation of a possible example of the device according to the invention.

BRIEF DESCRIPTION OF THE FIGURES

FIG. 1 is a schematic of an embodiment of the disclosed gas mixture purification device and method.

DETAILED DESCRIPTION OF THE INVENTION

The device 1 for purifying a gas mixture shown in the FIGURE comprises a purification circuit whose inlet 2 is supplied with gas to be purified containing neon, helium and impurities of the type of gases present in the air.

For example the gas mixture or raw gas consists of nitrogen, neon, helium, hydrogen, carbon monoxide and possible traces of other gases (argon, oxygen, carbon dioxide, etc.).

For example, the gas mixture to be purified comprises neon in a proportion by volume between 15 and 65%, helium in a proportion by volume between 3 and 20%, hydrogen in a proportion by volume between 0.2 and 4%, and nitrogen in a proportion by volume between 20 and 60%.

The pressure of the mixture may be of the order of 1.5 bar and the temperature of the order of 5 to 35° C. at plant inlet for example.

Preferably the device is intended to produce concentrated neon in a proportion by volume between 85 and 100% and notably more than 99%, for example at least 99.999%.

Downstream of the inlet, the device 1 may comprise a compressor 3 optionally with a system (not shown, for reasons of simplification) for cooling the compressed gas to room temperature.

Downstream of the compressor 3, the device preferably comprises a unit 4 for withdrawing at least part of the hydrogen contained in the mixture.

For example, this unit 4 performs "hot" purification of the compressed raw gas to remove the impurities $H_2$+CO via controlled injection of $O_2$ into or upstream of a catalyst bed (for example alumina+coating of the palladium oxide type). The exothermic chemical reaction leads to the formation of water and $CO_2$. These compounds may be removed from the raw mixture by liquefaction (cf. water separating pot 6 for the compound $H_2O$) and adsorption in a molecular sieve (for example of type 13×, alumina or silica gel).

For this purpose, downstream of this unit 4 and upstream of the water separating pot 6, the gas may be cooled in an exchanger 5.

Downstream of the water separating pot 6, the device preferably comprises a desiccator 7 for removing at least part of the water vapour and/or $CO_2$ contained in the mixture. For example, water and $CO_2$ may be removed in columns of molecular sieves that operate alternately (one is in the adsorption phase while the other is in the regeneration phase, for example with a stream of hot nitrogen or some other inert gas).

Downstream of the desiccator 7, the mixture enters a cold box 19 (for example insulated under vacuum) in which the mixture is cooled in a first cryogenic cooling exchanger 8. This first cryogenic cooling exchanger 8 is for example a plate-type countercurrent exchanger configured to cool the mixture to a temperature between 65K and 110K, for example 80K.

Downstream, the mixture is cooled in one or two baths 9, 10 of liquid nitrogen (for example by heat exchange with a heat exchanger, notably tubular, which conveys the mixture). The first bath 9 of liquid nitrogen is for example maintained at atmospheric pressure and at saturation, while the second bath 10 of liquid nitrogen is for example maintained at a pressure below atmospheric pressure (for example 0.18 bar abs) and at a temperature of 65K.

Downstream, a separating pot 11 recovers the liquid phase consisting essentially of nitrogen. This liquid may then be recycled to at least one of the two nitrogen baths 9, 10 in order to utilize this cryogenic fluid by integrating it in the heat balance of the unit.

The gas phase is then purified in a unit 12 for purification by cryogenic adsorption. This unit 12 comprises for example two molecular sieves with alternating operation (adsorption/regeneration) to trap the nitrogen, oxygen and argon.

Downstream of this unit 12, the mixture consists essentially of helium and neon.

This mixture may be cooled in an exchanger 13 to a temperature of the order of 35K for example. This exchanger 13 is for example of the countercurrent tubular type, which exchanges with the purified neon (as described in more detail below). This heat exchanger may for example have several internal tubes, conveying for example purified neon to be heated, in a shell.

Downstream, the mixture is cooled, for example to around 25K, by means of a cooling unit 14 comprising at least one cryocooler equipped with a cold head for example that extracts the heat from the mixture via a heat exchanger.

"Cryocooler" denotes a machine for cold production that is not in stages, at a constant temperature, such as a cryocooler for example of the Gifford McMahon type, pulsed gas tube, cryocooler of the Stirling type or cryocooler of the Joule-Thomson type.

This "cryocooler" machine is thus not a cooling loop (for example with helium) as described in the document cited above.

For example, the cooling unit 14 comprises one or more cryocoolers in series and one or more heat exchangers (for example made of copper or aluminium) receiving the fluid mixture, in heat exchange with the cold heads of said cryocoolers in series.

The cooled mixture goes into a phase separating pot 15. The liquid neon is recovered as the feed for at least one cryogenic distillation column 16.

The gas mixture recovered may be used for cooling the heat shield of the distillation column 16 for example. An expansion valve (not shown) may be provided between the phase separating pot 15 and the distillation column 16 to lower the pressure, for example to 1.5 bar, and facilitate helium-neon separation.

The distillation column 16 may be without a condenser. The gas at the top of the column (half neon, half helium for example) may optionally be recycled to the compressor 3 at the inlet 2 of the device 1.

For example, separation of the neon/helium mixture (about 1 vol % of helium at the outlet of the phase separator 15) may be effected in a distillation column 16 filled with packing (structured or bulk). A still with a heater may give less than 3 ppmv of helium at liquid extraction from the cryogenic distillation column 16.

The purified neon may thus be recovered in the liquid phase. This cold liquid neon may be arranged to undergo heat exchange with the cooling exchanger 13 located between the unit 12 for purification by cryogenic adsorption and the cryogenic cooling unit 14.

This cold liquid neon may then also undergo heat exchange with at least one of the nitrogen baths (for example nitrogen bath 9) and then with the first cryogenic cooling exchanger 8.

At the outlet 18 of the cold box, this concentrated neon gas may be heated to room temperature and then for example compressed in high-pressure cylinders.

Thus, the device performs cryogenic purification of the raw gas with the aim of separating neon and helium from the other remaining components ($N_2$, traces of gases of the air). The nitrogen is separated from the raw mixture by liquid condensation for example (at 77K and then at 65K) and then by cryogenic adsorption (for example at 65K). The cold sources for carrying out these separations and for cooling the raw mixture may be liquid nitrogen at saturation at or above atmospheric pressure and/or liquid nitrogen at saturation at below-atmospheric pressure. The helium and neon that remain following the adsorption phase are cooled to a temperature close to 25 K (temperature close to the triple point of the Ne pure substance) using one or more cryocoolers (which may be of the Gifford McMahon type, pulse-tube, etc.). At this temperature, a high proportion of the neon will be liquefied and can be separated from the gas phase richer in helium. However, the neon-rich liquid phase will have to be distilled in order to separate the neon from a residue of helium dissolved in neon (about 1 vol %).

The device makes it possible to reach a very high neon purity (<10 ppmv of impurities).

As illustrated by the dotted lines in the FIGURE, the bath or baths 9, 10 of nitrogen may be supplied with cooling fluid (source of liquid nitrogen for example outside the cold box) via at least one supply line 20. Moreover, lines 21 may be provided for recovering vaporized gas from the bath or baths 9, 10. These recovery lines 21 may be put in heat exchange with the first cryogenic cooling exchanger 8. This fluid flowing in the recovery lines 21 may then be collected to an outlet of the cold box.

According to a possible variant, the cooling unit 14 could comprise or consist of a device for cold production operating according to a Claude cycle (closed cycle based on neon and/or hydrogen, the coldest part of which is imposed by the temperature of liquefaction of the fluid at a given pressure). Conventionally, a Claude cycle comprises a fluid that performs one or more reverse Brayton cycles associated with an expansion system (notably valve with Joule-Thomson effect) that expands the fluid to reach a target cold temperature. The cold end obtained by this expansion constitutes the local cold source.

According to another possible variant (in combination or as an alternative), the unit 4 for withdrawing hydrogen could be eliminated and the installation may be used for purifying hydrogen, i.e. for producing hydrogen free from impurities of the helium, nitrogen, and argon type for example.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for purifying a gaseous fluid mixture to produce a concentrated neon gas, starting from a mixture comprising neon, said device comprising, in a cold box housing a cryogenic purification circuit comprising, in series, at least one unit for purifying the mixture by cryogenic adsorption at a temperature between 65K and 100K, then a unit for cooling the fluid mixture to a temperature between 25 and 65 K and then a unit for cryogenic distillation of the fluid mixture to produce a concentrated liquid at the outlet of the cryogenic distillation unit, characterized in that the unit for cooling the fluid mixture to a temperature between 25 and 65 K comprises at least one cryocooler that extracts thermal power from the mixture via a heat exchanger, the at least one cryocooler comprising at least one cryocooler of the Gifford McMahon type or a pulsed gas tube or a cryocooler of the Stirling type.

2. The device of claim 1, wherein the cooling unit comprises several cryocoolers in series and at least one heat exchanger receiving the fluid mixture, in heat exchange with the cold surfaces of said cryocoolers in series.

3. The device of claim 1, further comprising, in the cold box upstream of the unit for purification by cryogenic adsorption: i) a first cryogenic exchanger for cooling the mixture configured to cool the mixture to a temperature between 65K and 110K, and/or ii) at least one bath of liquid nitrogen in heat exchange with a pipeline that conveys the fluid mixture.

4. The device of claim 1, wherein the unit for purification by cryogenic adsorption comprises at least two adsorbers arranged in parallel immersed in baths of liquid nitrogen at 65K and operating alternately between adsorption and regeneration phases.

5. The device of claim 1, wherein the unit for cryogenic distillation is a column for separating neon and helium.

6. The device of claim 1, further comprising a pipeline for recovery of the concentrated liquid at the outlet of the unit for cryogenic distillation and in that the recovery pipeline is put in heat exchange with at least one unit for cooling the mixture located in the cold box.

7. The device of claim 6, wherein the pipeline for recovery of the concentrated liquid is in heat exchange with a: i) bath of liquid nitrogen in heat exchange with a pipeline that conveys the mixture upstream of the unit (12) for purification by cryogenic adsorption, and/or ii) an exchanger for cooling the mixture located upstream of the cryogenic cooler.

8. The device of claim 1, further comprising, upstream of the cold box: i) a unit for withdrawing at least part of the hydrogen contained in the mixture, and/or ii) a desiccator for withdrawing at least part of the water and/or $CO_2$ contained in the mixture.

9. The device of claim 8, wherein the unit for withdrawing at least part of the hydrogen contained in the mixture comprises a catalytic reactor configured for converting the hydrogen in the mixture to water by reaction with oxygen.

10. The device of claim 8, wherein the desiccator comprises at least one adsorbent for trapping water and carbon dioxide operating alternately.

11. The method for purifying a gas mixture comprising neon to produce a neon-enriched gas using the purification device of claim 1, said method comprising the steps of:
purifying the gas mixture by cryogenic adsorption via unit for purification by cryogenic adsorption at a temperature between 63.5K and 80K to remove at least part of the nitrogen, oxygen, carbon monoxide and argon from the mixture;
cooling the gas mixture to a temperature between 25 and 65 K via the cryocooler and close to the triple point of neon in order to condense the neon;
cryogenically distilling the mixture in the unit for cryogenic distillation to produce neon-enriched liquid at the outlet of the unit for cryogenic distillation; and
warming the neon-enriched liquid to produce the neon-enriched gas.

12. The method of claim 11, wherein:
the gas mixture to be purified comprises 15 and 65 vol % neon, 3-20 vol % helium, 0.2-4 vol % hydrogen, and 20-60 vol % nitrogen; and
said neon-enriched gas contains 85-100 vol % neon.

13. The method of claim 11, wherein a ratio of a volume flow rate of neon at an outlet of the device to a volume flow rate of neon at an inlet of the device is greater than 0.85.

14. The method of claim 13, wherein the ratio of the volume flow rate of neon at the outlet of the device to the volume flow rate of neon at the inlet of the device is between 0.85-0.98.

* * * * *